(12) United States Patent
Blinov et al.

(10) Patent No.: US 10,373,168 B2
(45) Date of Patent: Aug. 6, 2019

(54) METHOD AND SYSTEM FOR RETRY PROCESSING OF CONTROLLED PAYMENT TRANSACTIONS

(71) Applicant: MasterCard International Incorporated, Purchase, NY (US)

(72) Inventors: Mikhail Blinov, Dublin (IE); Gregory Coburn, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 750 days.

(21) Appl. No.: 14/594,582

(22) Filed: Jan. 12, 2015

(65) Prior Publication Data

US 2016/0203484 A1    Jul. 14, 2016

(51) Int. Cl.
*G06Q 20/40* (2012.01)

(52) U.S. Cl.
CPC ....... *G06Q 20/405* (2013.01); *G06Q 20/4037* (2013.01); *G06Q 20/4093* (2013.01)

(58) Field of Classification Search
CPC .................................................. G06Q 40/02
USPC .......................................................... 705/44
See application file for complete search history.

(56) References Cited

U.S. PATENT DOCUMENTS

| | | |
|---|---|---|
| 6,636,833 B1 | 10/2003 | Flitcroft et al. |
| 7,136,835 B1 | 11/2006 | Flitcroft et al. |
| 7,233,920 B1 | 6/2007 | Rodriguez, Jr. et al. |
| 7,386,509 B1 * | 6/2008 | Swift ..................... G06Q 20/04 705/39 |
| 7,567,934 B2 | 7/2009 | Flitcroft et al. |
| 7,571,142 B1 | 8/2009 | Flitcroft et al. |
| 7,593,896 B1 | 9/2009 | Flitcroft et al. |

(Continued)

FOREIGN PATENT DOCUMENTS

RU    2467501 C2    11/2012

OTHER PUBLICATIONS

Trouble Shooting Failed Credit Card Transactions or Processing—Chris Anderson 2018 (Year: 2018).*

(Continued)

*Primary Examiner* — Abhishek Vyas
*Assistant Examiner* — Murali K Dega
(74) *Attorney, Agent, or Firm* — Buchanan Ingersoll & Rooney PC (57) ABSTRACT

A method for retrying processing of a controlled payment transaction includes: storing, in a first database, account profiles, each including data related to a transaction account including an account identifier and account controls; storing, in a second database, the account profiles stored in the first database, wherein data in each account profile in the second database corresponds to data in the corresponding account profile in the first database; receiving an authorization request for a transaction, the request including a specific account identifier and transaction data; determining an approval or denial of the transaction based on the account controls included in a profile in the second database including the specific account identifier and the transaction data if an attempt to determine approval or denial based on the account controls included in a corresponding account profile in the first database fails; and processing the payment transaction based on the determination.

16 Claims, 6 Drawing Sheets

(56) References Cited

U.S. PATENT DOCUMENTS

| | | | |
|---|---|---|---|
| 8,676,707 | B2 | 3/2014 | Flitcroft et al. |
| 8,756,150 | B2 | 6/2014 | Flitcroft et al. |
| 9,280,765 | B2 * | 3/2016 | Hammad ............... G06Q 20/12 |
| 2003/0101145 | A1 | 5/2003 | Fang et al. |
| 2008/0052244 | A1 | 2/2008 | Tsuei et al. |
| 2009/0070260 | A1 | 3/2009 | Flitcroft et al. |
| 2010/0274572 | A1 * | 10/2010 | Hammad ............. G06Q 20/202 |
| | | | 705/1.1 |
| 2011/0055231 | A1 | 3/2011 | Huck et al. |
| 2012/0259782 | A1 | 10/2012 | Hammad |
| 2013/0166628 | A1 | 6/2013 | Theado et al. |
| 2014/0025445 | A1 | 1/2014 | Martinez et al. |
| 2014/0258135 | A1 | 9/2014 | Park et al. |
| 2015/0006345 | A1 | 1/2015 | Amancherla |
| 2016/0019547 | A1 * | 1/2016 | Gurnani ........... G06Q 20/40145 |
| | | | 705/44 |

OTHER PUBLICATIONS

Notification of Transmittal of the International Search Report and the Written Opinion of the International Searching Authority (Forms PCT/ISA/220, PCT/ISA/210 and PCT/ISA/237) dated Apr. 29, 2016, by the Korean Intellectual Property Office in corresponding International Application No. PCT/US2016/012946. (8 pages).

Extended European Search Report dated Jun. 6, 2018, by the European Patent Office in corresponding European Patent Application No. 16737691.2-1217. (13 pages).

Office Action dated May 21, 2018, by the Patent Office of the Russian Federation in corresponding Russian Patent Application No. 2017127471, with English translation of the Office Action. (10 pages).

* cited by examiner

METHOD AND SYSTEM FOR RETRY PROCESSING OF CONTROLLED PAYMENT TRANSACTIONS

FIELD

The present disclosure relates to the processing of controlled payment number transactions, specifically the use of a redundant database to retry processing of a controlled payment number transaction upon failure of first processing of the transaction for increased reliability and efficiency.

BACKGROUND

Controlled payment numbers, such as offered by the InControl™ platform by MasterCard®, provide cardholders with great versatility and control over their payment cards. Controls and limits can be set on payment cards for self-imposed budgeting, for management of funds, for limiting spending by children or employees, to provide for greater protection from fraud and theft, and more. Because of the many benefits of their use, controlled payment numbers are steadily seeing more and more use in the market.

However, controlled payment numbers are not without their drawbacks. Because of the vast number of transactions that are processed across their rails every day, payment networks are designed to perform their processing of transactions very quickly, in times measured in milliseconds. This is often accomplished for payment transactions using traditional payment cards with a very high rate of success. However, when a controlled payment number is used, the payment network must often perform additional processing steps, which include the identification of controls active for the controlled payment number and the processing thereof (e.g., checking to see if account limits are met or exceeded). As a result, this can increase processing time for these transactions.

Increased processing time can come as a result of long queues that develop for transactions, a large number of controls that must be calculated and checked, and more. In some instances, a transaction may timeout if not processed quickly enough. For some payment networks, the window for processing a transaction may be so small (e.g., in order to provide greater network efficiency and reliability to its members), that a timeout could even be caused by data being stored on the outer edge of a hard disk rather than closer to the center, with the extra distance resulting in enough of a time increase that the processing time is not met. Because of these additional results and concerns, some controlled payment number transactions may therefore timeout.

Thus, there is a need to provide for more reliable processing of controlled payment number transactions. By providing for better reliability in the processing of controlled payment number transactions, particularly in instances where a controlled payment number transaction would timeout in a traditional payment network, overall network reliability and efficiency may increase, which may be of benefit to not only the payment network themselves, but also to the merchants, issuers, and cardholders associated with the payment network as well.

SUMMARY

The present disclosure provides a description of systems and methods for identifying consumer travel paths and trip patterns based on transaction history.

A method for retrying processing of a controlled payment number transaction includes: storing, in a first database, a plurality of account profiles, wherein each account profile includes data related to a transaction account including at least an account identifier and one or more account controls; storing, in a second database, each of the plurality of account profiles stored in the first database, wherein data included in each account profile stored in the second database corresponds to data included in the corresponding account profile in the first database, and wherein the second database is a read-only database; receiving, by a receiving device, an authorization request for a payment transaction, wherein the authorization request includes at least a specific account identifier and transaction data; determining, by a processing device, an approval or denial of the payment transaction based on at least the one or more account controls included in an account profile stored in the second database where the included account identifier corresponds to the specific account identifier and the transaction data included in the received authorization request if an attempt, by the processing device, to determine approval or denial of the payment transaction based on the one or more account controls included in a corresponding account profile stored in the first database where the included account identifier corresponds to the specific account identifier fails; and processing, by the processing device, the payment transaction based on the determined approval or denial.

A system for retrying processing of a controlled payment number transaction includes a first database, a second database, a receiving device, and a processing device. The first database is configured to store a plurality of account profiles, wherein each account profile includes data related to a transaction account including at least an account identifier and one or more account controls. The second database is configured to store each of the plurality of account profiles stored in the first database, wherein data included in each account profile stored in the second database corresponds to data included in the corresponding account profile in the first database, and wherein the second database is a read-only database. The receiving device is configured to receive an authorization request for a payment transaction, wherein the authorization request includes at least a specific account identifier and transaction data. The processing device is configured to: determine an approval or denial of the payment transaction based on at least the one or more account controls included in an account profile stored in the second database where the included account identifier corresponds to the specific account identifier and the transaction data included in the received authorization request if an attempt, by the processing device, to determine approval or denial of the payment transaction based on the one or more account controls included in a corresponding account profile stored in the first database where the included account identifier corresponds to the specific account identifier fails; and process the payment transaction based on the determined approval or denial.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Retrying Processing of Controlled Payment Number Transactions

Figure 1:
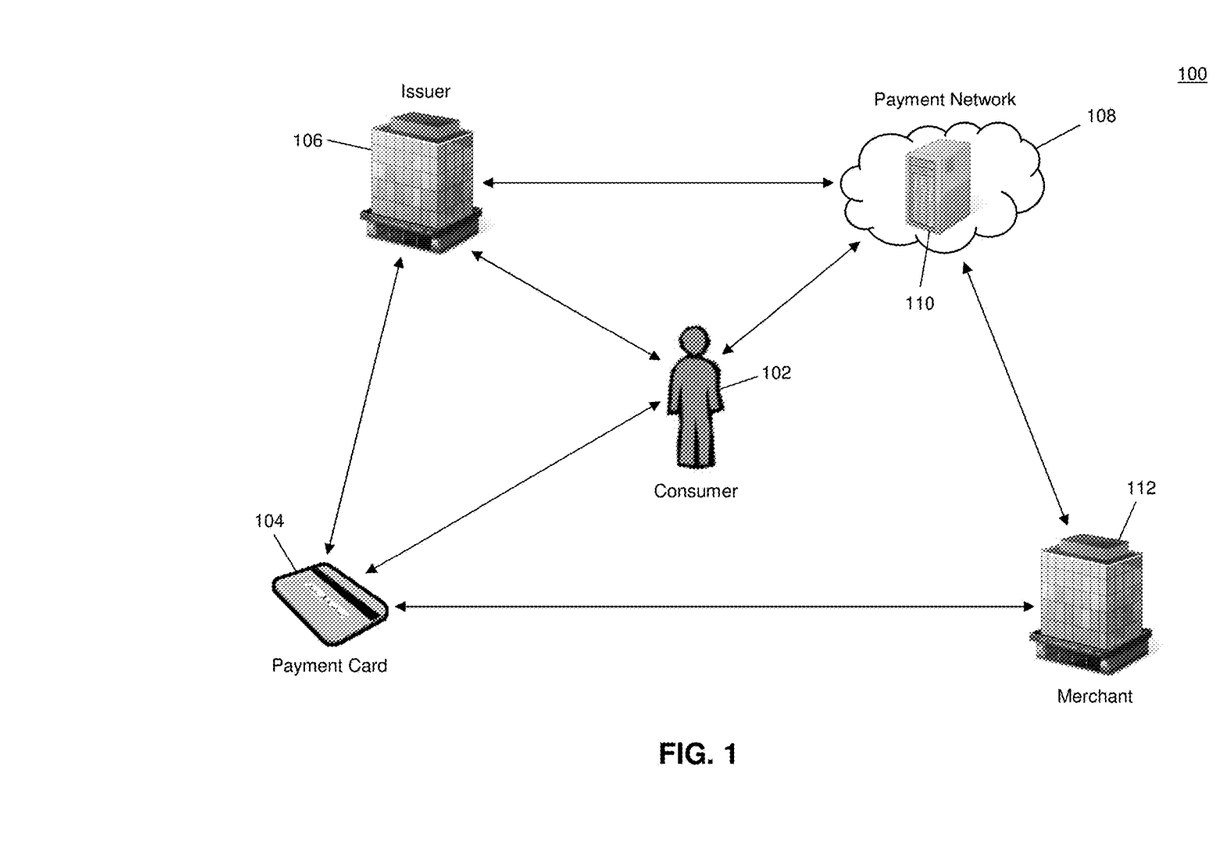
FIG. 1 is a block diagram illustrating a high level system architecture for retry processing of controlled payment number transactions in accordance with exemplary embodiments.

FIG. 1 illustrates a system 100 for retrying processing of controlled payment number transactions using dual databases for storing account details and controls and for the processing of transactions associated thereto.

In the system 100, a consumer 102 may possess a payment card 104. The payment card 104 may be issued by an issuer 106, which may be any financial institution configured to issue payment cards to consumers on one or more transaction accounts, such as an issuing bank. The payment card 104 issued to the consumer 102 may be subject to one or more controls, and may therefore be considered to be a controlled payment number (CPN).

Controls on the payment card 104 may be set by the consumer 102 themselves or the issuer 106. For example, the issuer 106 may set controls on the payment card 104 as part of an agreement in the establishing of the related transaction account. In an exemplary embodiment, controls may be managed and enforced by a payment network 108 configured to process payment transactions funded via the payment card 104. Controls may be set by the consumer 102 and/or issuer 106 providing their requested controls to the payment network 108 using methods and systems that will be apparent to persons having skill in the relevant art.

The payment network 108 may include a processing server 110. The processing server 110, discussed in more detail below, may be configured to process payment transactions where payment cards 104 that are controlled payment cards are used to fund the transaction, referred to here as "controlled payment number transactions" or "controlled payment transactions." The consumer 102 may use the payment card 104, which may have a CPN subject to one or more controls registered with the payment network 108 and/or processing server 110, at a merchant 112 to fund a payment transaction. The merchant 112 may read the card details of the payment card 104 using traditional methods and systems, and may submit (e.g., directly or via an acquirer) an authorization request to the payment network 108 for the controlled payment transaction.

The payment network 108 may receive the authorization request, which may then be processed by the processing server 110 using the methods discussed herein. The processing server 110 may first attempt to process the payment transaction using a first database that includes account details for the payment card 104, such as the controls set on the payment card 104. If the processing using the first database fails, the processing server 110 may retry processing of the controlled payment transaction using a second database, discussed in more detail below. The processing server 110 may be configured such that, when a controlled payment transaction has processing retried, it may receive priority by the processing server 110 (e.g., such as via queues or additional processing units, as discussed below), such as to ensure that the processing is successful on the second try. The processing server 110 and/or payment network 108 may then continue to process the controlled payment transaction using traditional methods (e.g., applying fraud rules, obtaining approval/denial from the issuer 106, etc.) once the account controls have been checked and processed accordingly.

By providing means for retrying the processing of a controlled payment transaction after a first attempt fails, such as due to a timeout, the processing server 110 may achieve increased reliability of transaction processing over traditional payment networks 108 using the methods and systems discussed herein. As a result, more controlled payment transactions may be processed successfully, which may result in higher consumer 102, merchant 112, and issuer 106 satisfaction, as well as a greater number of successfully processed transactions, increasing revenue for the payment network 108, issuers 106, and merchants 112 as well.

Processing Server

Figure 2:
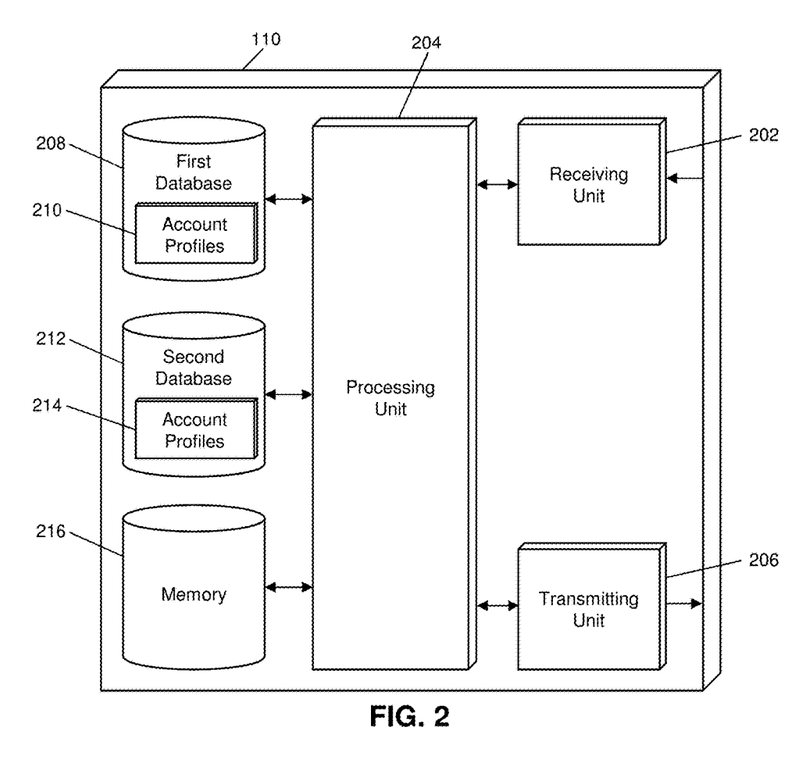
FIG. 2 is a block diagram illustrating the processing server 102 of FIG. 1 for retrying processing of controlled payment number transactions in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 110 suitable for performing the functions as discussed herein. For example, the computer system 600 illustrated in FIG. 6 and discussed in more detail below may be a suitable configuration of the processing server 110.

The processing server 110 may include a receiving unit 202. The receiving unit 202 may be configured to receive data over one or more networks via one or more network protocols. The receiving unit 202 may receive account details from the issuer 106 for one or more transaction accounts. Account details may include at least a transaction account number associated with a transaction account, which may be used in the processing of payment transactions funded by the associated transaction account. The receiving unit 202 may also be configured to receive controlled payment number requests and one or more account controls from the issuer 106 or consumer 102 associated with the transaction account. Controlled payment number requests may include at least an account identifier associated with the transaction account for which the controlled payment number is requested.

The processing server 110 may include a first database 208. The first database 208 may be configured to store a plurality of account profiles 210. Each account profile 210 may include data related to a transaction account including at least the transaction account number associated with the related transaction account. In some instances, the account profile 210 may also include an account identifier. The account identifier may be a unique value suitable for identification of the account profile 210, and may be the transaction account number itself, or other suitable value, such as an identification number, username, e-mail address, etc.

The processing server 110 may further include a processing unit 204. The processing unit 204 may be configured to perform the functions of the processing server 110 discussed herein as will be apparent to persons having skill in the relevant art. When a controlled payment number request is received by the receiving unit 202, the processing unit 204 may identify an account profile 210 in the first database 208 associated with the controlled payment number request, such as by using the account identifier included therein. The processing unit 204 may then identify a controlled payment number (CPN) to be issued to the consumer 102 that is subject to the one or more account controls included in the received controlled payment number request. The processing unit 204 may update the account profile 210 to include the identified CPN and associated one or more account controls. In some embodiments, each account profile 210 may be associated with a single CPN. In other embodiments, each account profile 210 may be associated with a single transaction account, and may include data related to a plurality of CPNs that are associated with the single transaction account.

The processing server 110 may also include a transmitting unit 206. The transmitting unit 206 may be configured to transmit data over one or more networks via one or more network protocols. The transmitting unit 206 may transmit the identified CPN to the consumer 102 or the issuer 106 for use. The CPN may be transmitted as a virtual payment card 104 (e.g., to a computing device associated with the consumer 102) or may be transmitted in the form of a physical payment card 104 that is issued to the consumer 102 using traditional methods and systems. The identification and/or generations of CPNs and the issuing of payment cards associated thereto to a consumer 102 will be apparent to persons having skill in the relevant art.

The receiving unit 202 may be further configured to receive authorization requests for controlled payment transactions. Authorization requests may include transaction data, such as a transaction amount, transaction time and/or date, geographic location, product data, merchant data, point of sale data, offer data, loyalty data, etc., and may also include a CPN associated with the payment card 104 used to fund the controlled payment transaction. The processing unit 204 may be configured to identify an account profile 210 in the first database 208 that includes the CPN and may then identify if the payment transaction is to be approved or denied based on the one or more account controls associated with the CPN.

For example, if an account control is a limit on the overall spending for the associated CPN during a predetermined period of time, the processing unit 204 may determine if the controlled payment transaction would result in the spending for the CPN exceeding the limit. If the limit would be exceeded, then the processing unit 204 may deny the payment transaction. Denial of the payment transaction may include the transmitting, by the transmitting unit 206, of an authorization response indicating denial of the payment transaction to the merchant 112 (e.g., via an acquirer). In some instances, the authorization request may be forwarded to the issuer 106 as during traditional processing of payment transactions, with a recommendation to deny the payment transaction due to the exceeded account control. If the limit is not exceeded, then the authorization request may be forwarded to the issuer 106 and/or otherwise processed as a traditional payment transaction. If the payment transaction is successfully approved and processed, then the processing unit 204 may update the data stored in the account profile 210 accordingly, such as to reflect increased spending for consideration of the account control in future transactions.

In some instances, the processing of the account controls by the processing unit 204 may fail, such as due to a timeout due to hardware failure, excessive data read times, etc. In such instances, the processing server 110 may include a second database 212 for use in retrying processing of the controlled payment transaction. The second database 212 may include a plurality of account profiles 214, each of which may directly correspond to the account profiles 210 stored in the first database 208. In some embodiments, the second database 212 may be a read-only database, and may be used as redundant storage of the account profiles 210 stored in the first database 208 to be used in instances where processing is retried.

If the processing of the account controls for the controlled payment transaction fails using the first database 208, the processing unit 204 may be configured to retry processing of the account controls using the second database 212. In some embodiments, the processing server 110 may include a second processing unit. In such an embodiment, the second processing unit may process the account controls using the second database 212 in place of the first processing unit 204. Once the account controls have been processed, the processing unit 204 (or second processing unit, if applicable) may continue with the traditional processing of the controlled payment transaction accordingly. In instances where the retry processing is successful and the transaction is approved and processed, the corresponding account profile 210 in the first database 208 may be updated accordingly.

In some embodiments, account profiles 214 in the second database 212 may be updated at the same time that a corresponding account profile 210 in the first database 208 is updated following the processing of a controlled payment transaction. In other embodiments, data included in the second database 212 may be updated at predetermined intervals, such as hourly, daily, etc. In some instances, the second database 212 may be updated at times based on processing capacity of the processing server 110, such as during a time when the number of payment transactions being processed is below a predetermined threshold.

In some embodiments, the processing server 110 may utilize transaction processing queues. The processing server 110 may include a transaction processing queue, such as stored in a memory 216 that may store authorization requests for payment transactions to be processed by the processing unit 204. The queue may be designed such that payment transactions are processed in the order in which they are received. In instances where processing of account controls for a controlled payment transaction fails, the processing unit 204 may be configured to return the authorization request for the transaction to the top of the transaction processing queue for immediate processing using the second database 212, to help ensure that the controlled payment transaction can be processed within a set time.

In some embodiments, the processing server 110 may include two transaction processing queues. A first transaction processing queue may be used for transactions being processed for the first time, and a second transaction processing queue may be used for controlled payment transactions where processing of account controls is being retried. In such an embodiment, the processing unit 204 may be configured to process transactions in the second transaction processing queue ahead of other transactions. In embodiments where the processing server 110 includes two or more processing units, the additional processing units may be configured to process account controls for transactions in the second transaction processing queue, to ensure that the controlled payment transactions are processed before timing out.

The processing server 110 may also include the memory 216. The memory 216 may be configured to store data suitable for performing the functions of the processing server 110 discussed herein. For example, the memory 216 may be configured to store rules and/or algorithms for the generation and identification of CPNs, for the calculation of account control values, for the application of account controls to a transaction account and payment transaction, for the management of transaction processing queues, and for traditional processing of payment transactions, such as fraud scoring, etc. Additional data that may be stored in the memory 216 will be apparent to persons having skill in the relevant art.

It will be apparent to persons having skill in the relevant art that the processing server 102 may include additional and/or alternative components to the components illustrated in FIG. 2 and discussed herein, and that the components illustrated in FIG. 2 may be further configured to perform additional functions. For example, the components of the processing server 102 may be further configured to perform additional functions necessary for the processing of payment transactions, such as the receiving and transmitting of authorization requests and responses to and from issuers 106, processing and application of fraud rules, etc.

Retry Processing of Controlled Payment Transactions

Figure 3:
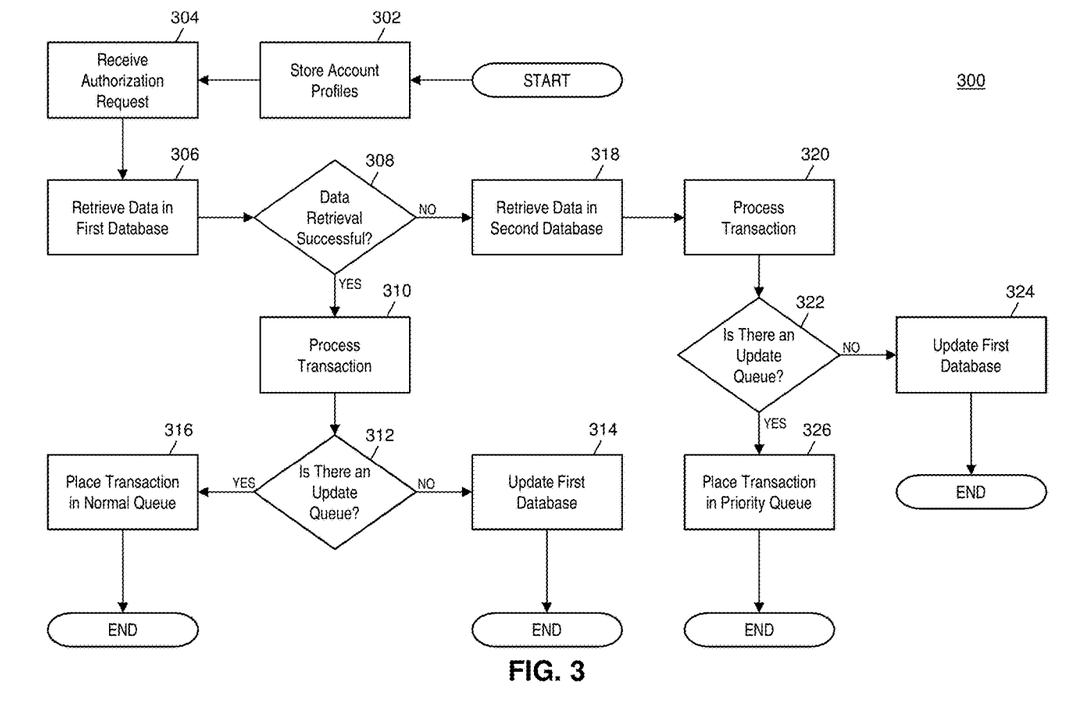
FIG. 3 is a flow diagram illustrating a process for the processing of controlled payment number transactions using the processing server of FIG. 2 in accordance with exemplary embodiments.

FIG. 3 illustrates a process 300 for the retrying of processing of account controls for controlled payment transactions using the processing server 110 of the system 100 of FIG. 1.

In step 302, the account profiles 210 and 214 may be stored in the first database 208 and second database 212, respectively, of the processing server 110. The account profiles 210 and 214 may include data related to a transaction account including at least an account identifier associated with a CPN and one or more account controls. In step 304, the receiving unit 202 of the processing server 110 may receive an authorization request for a payment transaction. The authorization request may include at least a specific account identifier associated with a CPN being used to fund the payment transaction.

In step 306, the processing unit 204 may attempt to retrieve data from a corresponding account profile 210 in the first database 208. The corresponding account profile 210 may be an account profile 210 that includes the account identifier included in the received authorization request. In step 308, the processing unit 204 may determine if the data retrieval was successful. If the data retrieval was successful, such as if the data was obtained from the account profile 210 within a predetermined period of time (e.g., the retrieval did not time out), then, in step 310, the processing unit 204 may process the payment transaction, which may include the checking of account controls, forwarding of the authorization request to an issuer, receiving and forwarding of an authorization response, etc.

In step 312, the processing unit 204 may determine if there is an update queue for updating of the data in the account profile 210 in the first database 208 that was used in the controlled payment transaction. If there is no update queue, then, in step 314, the processing unit 204 may directly update the account profile 210. Updating of the account profile 210 may include updating one or more values associated with the account controls, such as updating the amount of spending in a controlled category, etc. The management of account controls in an account profile 210 following processing of a payment transaction funded by an associated transaction account will be apparent to persons having skill in the relevant art. If there is a queue for updating the first database 208, then, in step 316, the transaction (e.g., the authorization request, authorization response, transaction data, etc.) may be placed in a normal queue for processing.

If, in step 308, the retrieval of data from the first database 208 was unsuccessful, then the process 300 may proceed to step 318. In step 318, the processing unit 204, or a second processing unit operating in place of the processing unit 204, may retrieve data from the corresponding account profile 214 in the second database 212. In step 320, the transaction may be processed, which may include the processing of account controls and additional functions for the processing of a payment transaction that will be apparent to persons having skill in the relevant art.

Once the transaction has been processed, in step 322, the processing unit 204 (e.g., or the second processing unit) may determine if there is an update queue for updating of the databases. If there is no update queue, then, in step 324, the processing unit 204 or second processing unit may update the corresponding account profile 210 in the first database 208 to reflect the processing of the controlled payment transaction. In some instances, step 324 may include the updating of the account profile 214 in the second database 212 as well. If there is an update queue, then, in step 326, the transaction may be stored in a priority queue, which may be used in place of the normal queue for transactions processed using the second database 212. In embodiments where the processing server 110 may have a single queue, step 326 may include the placing of the transaction at the top of the queue.

Queue Processing of Controlled Payment Transactions

Figure 4:
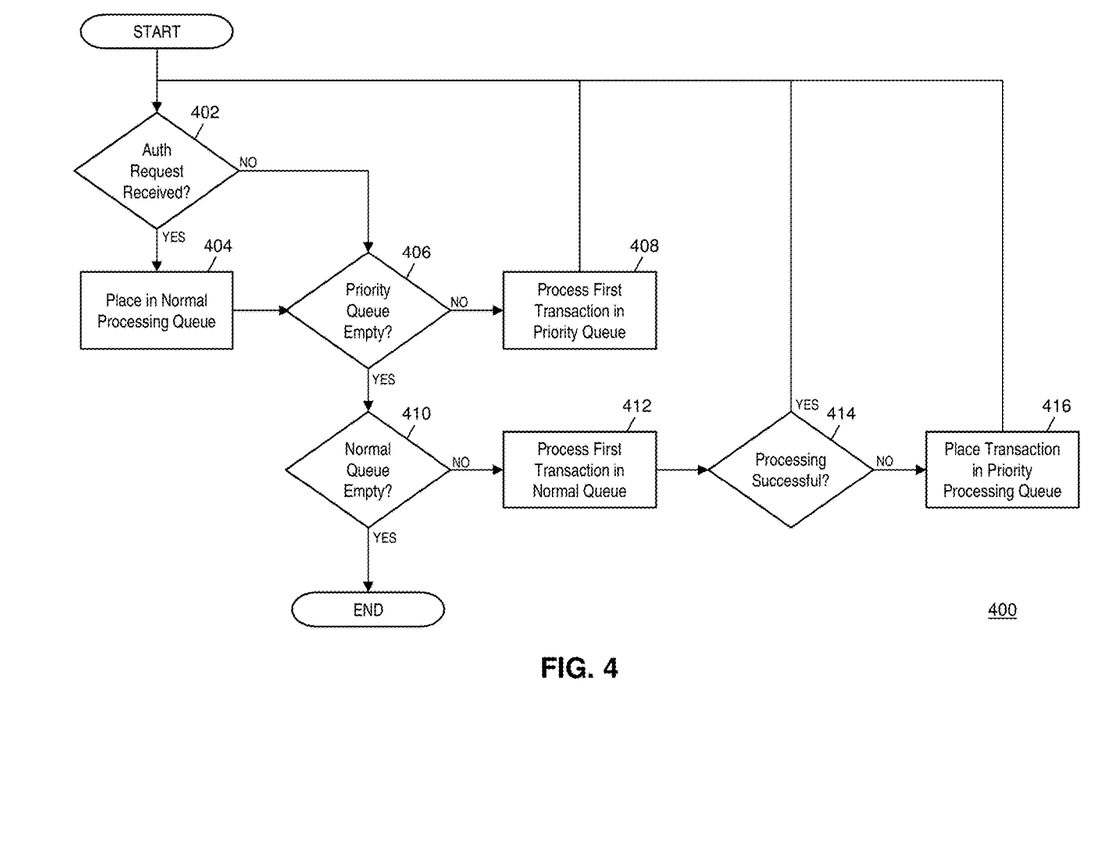
FIG. 4 is a flow diagram illustrating a process for processing queues of controlled payment number transactions in accordance with exemplary embodiments.

FIG. 4 illustrates a process 400 for the processing of controlled payment transactions where two transaction processing queues are used to manage first processing and retry processing of controlled payment transactions.

In step 402, the processing unit 204 of the processing server 110 may determine if the receiving unit 202 has received an authorization request for a payment transaction. If an authorization request has been received, then, in step 404, the authorization request may be placed in the normal processing queue behind any authorization requests already in the normal processing queue. Once the request has been placed in the queue, or if no new authorization request has been received, then, in step 406, the processing unit 204 may determine if the priority transaction queue is empty.

If the priority transaction queue is not empty, then the processing unit 204 (e.g., or a second processing unit) may process the first transaction in the priority transaction queue. Processing of the first transaction may include at least processing of account controls for the controlled payment transaction. Once the transaction has been processed, then the process 400 may return to step 402 to check for a new authorization request and to continue processing.

If, in step 406, the priority transaction queue is found to be empty, then, in step 410, the processing unit 204 may check to see if the normal transaction queue is empty. If the normal transaction queue is empty, the process 400 may be completed, or may return to step 402 and await a new authorization request. If the normal transaction queue is not empty, then, in step 412, the processing unit 204 may attempt to process the account controls for the first transaction in the normal processing queue. In step 414, the processing unit 204 may determine if the processing of the account controls for the transaction was performed successfully (e.g., did not time out). If the account controls for the controlled payment transaction were processed successfully, then the process 400 may return to step 402 to check for a new authorization request and continue processing. If the processing of the account controls was unsuccessful, then, in step 416, the transaction may be placed in the priority transaction queue for retrying of processing of the account controls for that controlled payment transaction.

It will be apparent to persons having skill in the relevant art that the process 400 illustrated in FIG. 4 and discussed herein may be used with respect to the processing of account controls for controlled payment transactions, but may also be used for the full processing of the controlled payment transactions as well. Alternatively, the process 400 may be used only for the processing of account controls for the payment transactions, and a separate process 400 and separate processing queues may be used for the traditional processing of the payment transactions once the account controls have been processed. Additional configurations of the processing server 110 for processing the account controls and payment transactions using the methods and systems discussed herein will be apparent to persons having skill in the relevant art.

Figure 5:
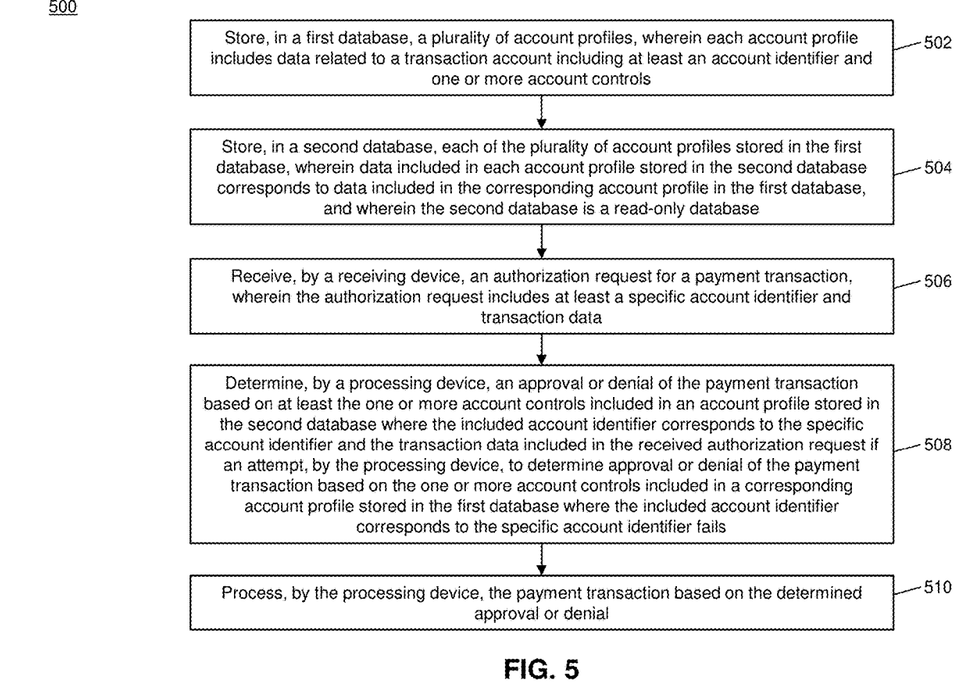
FIG. 5 is a flow chart illustrating an exemplary method for retrying processing of a controlled payment number transaction in accordance with exemplary embodiments.

Exemplary Method for Retrying Processing of a Controlled Payment Number Transaction FIG. 5 illustrates a method 500 for retrying processing of account controls for a controlled payment number transaction in instances where a first attempt at processing fails.

In step 502, a plurality of account profiles (e.g., account profiles 210) may be stored in a first database (e.g., the first database 208), wherein each account profile 210 includes data related to a transaction account including at least an account identifier and one or more account controls. In step 504, each of the plurality of account profiles 210 stored in the first database 208 may be stored in a second database (e.g., the second database 212), wherein data included in each account profile (e.g., account profile 214) stored in the second database 212 corresponds to data included in the corresponding account profile 210 in the first database 208, and wherein the second database 212 may be a read-only database. In step 506, an authorization request for a payment transaction may be received by a receiving device (e.g., the receiving unit 202), wherein the authorization request includes at least a specific account identifier and transaction data.

In step 508, a processing device (e.g., the processing unit 204) may determine an approval or denial of the payment transaction based on at least the one or more account controls included in an account profile 214 stored in the second database 212 where the included account identifier corresponds to the specific account identifier and the transaction data included in the received authorization request if an attempt, by the processing device 204, to determine approval or denial of the payment transaction based on the one or more account controls included in a corresponding account profile 210 stored in the first database 208 where the included account identifier corresponds to the specific account identifier fails. In one embodiment, the attempt to determine approval or denial of the payment transaction fails if the processing device 204 is unable to determine approval or denial of the payment transaction within a predetermined amount of time.

In step 510, the payment transaction may be processed, by the processing device 204, based on the determined approval or denial. In some embodiments, processing the payment transaction includes transmitting, by a transmitting device (e.g., the transmitting unit 206), (i) an authorization response indicating denial of the transaction as a response to the received authorization request if the payment transaction is determined to be denied, or (ii) the authorization request to a financial institution (e.g., the issuer 106) associated with the transaction account related to the account profile 214 where the included account identifier corresponds to the specific account identifier if the payment transaction is determined to be approved.

In one embodiment, the method 500 may further include updating, in the first database 208, data included in the account profile 210 where the included account identifier corresponds to the specific account identifier based on the transaction data included in the received authorization request. In a further embodiment, the data included in the account profile 210 may be updated if the payment transaction is determined to be approved.

In some embodiments, the method 500 may further include: storing, in a memory (e.g., the memory 216), a transaction processing queue, wherein the transaction processing queue includes one or more pending authorization requests for which processing is required and a determination associated with each of the one or more pending authorization requests. In a further embodiment, processing the payment transaction may include storing, in the memory 216, the received authorization request and the corresponding determination of approval or denial at a top of the transaction processing queue. In another further embodiment, the method 500 may even further include updating, for each authorization request included in the stored transaction processing queue, data included in an account profile 210 in the first database 208 where the included account identifier corresponds to an account identifier included in the respective authorization request based on the transaction data included in the respective authorization request.

In another further embodiment, the method 500 may even further include storing, in the memory 216, a priority transaction queue, wherein the priority transaction queue is configured to store pending authorization requests for which processing is required and a determination associated with each respective pending authorization request, and wherein the processing device 204 is configured to process pending authorization requests stored in the priority transaction queue before processing pending authorization requests stored in the transaction processing queue. In an even further embodiment, processing the payment transaction may include storing, in the memory 216, the received authorization request and the corresponding determination of approval or denial in the priority transaction processing queue.

Computer System Architecture

Figure 6:
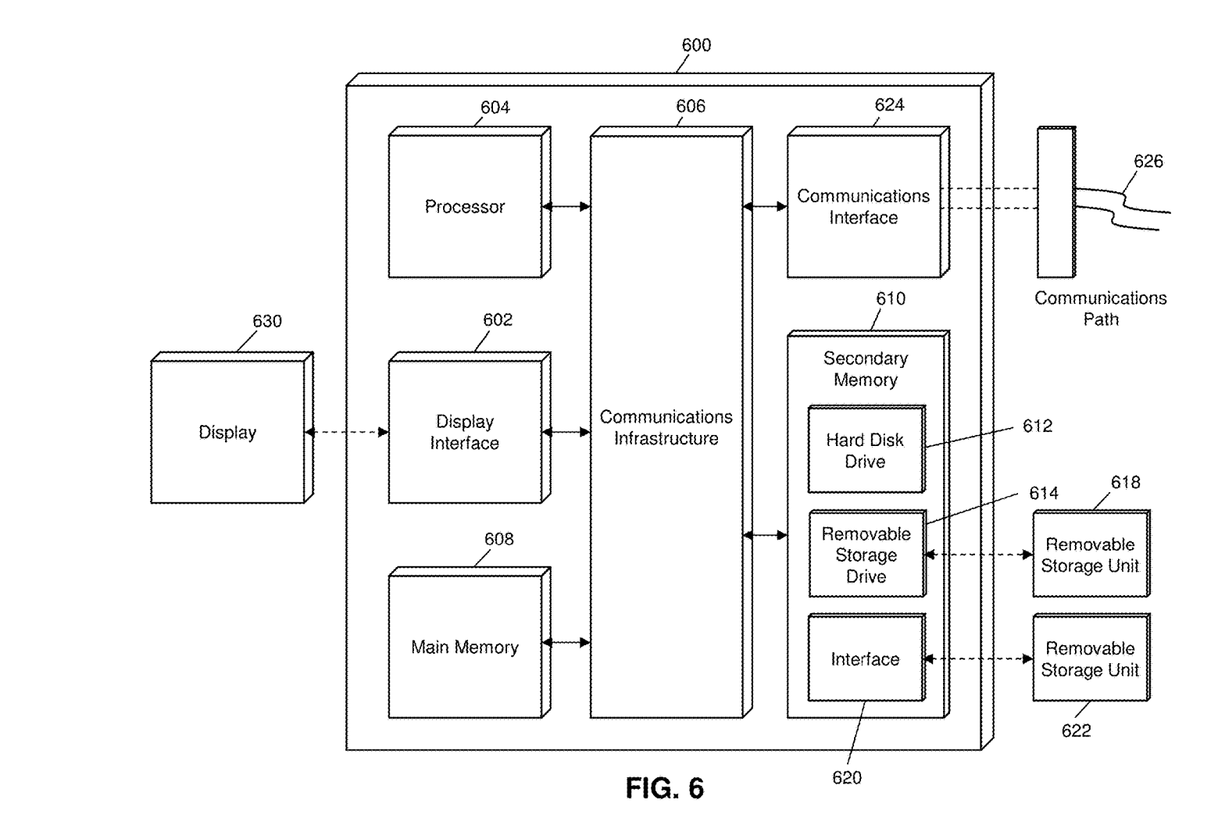
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 110 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for retrying processing of controlled payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for retrying processing of a controlled payment number transaction via dual processing and data redundancy, comprising:

storing, in a first database of a processing server, a plurality of account profiles, wherein each account profile includes data related to a transaction account including at least an account identifier and one or more account controls;

storing, in a second database of the processing server, each of the plurality of account profiles stored in the first database, wherein data included in each account profile stored in the second database corresponds to data included in the corresponding account profile in the first database, and wherein the second database is a read-only database;

storing, in a memory device, a normal transaction processing queue data structure, wherein the normal transaction processing queue data structure includes a first set of one or more pending authorization requests for which processing is required and a determination associated with each of the first set of one or more pending authorization requests;

storing, in the memory device, a priority transaction processing queue data structure, wherein the priority transaction processing queue data structure includes pending authorization requests for which processing is required and a determination associated with each respective pending authorization request, wherein the processing device is configured to process pending authorization requests stored in the priority transaction processing queue data structure before processing pending authorization requests stored in the normal transaction processing queue data structure;

receiving, by a receiving device of the processing server, via a point of sale device associated with a merchant, a current authorization request for a current payment transaction, wherein the current authorization request includes at least a specific account identifier and transaction data;

responsive to an unsuccessful attempt to determine, by a primary processing device of the processing server, approval or denial of the current authorization request for the current payment transaction based on the one or more account controls included in a corresponding account profile stored in the first database where the included account identifier corresponds to the specific account identifier:

storing, by a secondary processing device of the processing server in the memory device in the priority transaction processing queue data structure, the current authorization request for the current payment transaction; and determining, by the secondary processing device of the processing server, an approval or denial of the current payment transaction stored in the priority transaction processing queue data structure based on at least the one or more account controls included in an account profile stored in the second database where the included account identifier corresponds to the specific account identifier and the transaction data included in the received current authorization request;

processing, by the secondary processing device of the processing server, the current payment transaction based on the determined approval or denial, wherein the processing, by the second processing device of the processing server, of the current authorization request for the current payment transaction stored in the priority transaction processing queue data structure occurs before processing any of the pending authorization requests stored in the memory device in the normal processing queue data structure; and responsive to determining that the current payment transaction is to be approved, transmitting, by a transmitting device of the processing server, the current authorization request to a financial institution associated with the transaction account related to the account profile that includes an account identifier corresponding to the specific account identifier.

2. The method of claim 1, wherein processing the current payment transaction includes transmitting, by the transmitting device, (i) an authorization response indicating denial of the current payment transaction as a response to the received authorization request, responsive to determining that the current payment transaction is to be denied, or (ii) the current authorization request to an issuer of the transaction account related to the account profile that includes an account identifier corresponding to the specific account identifier, responsive to determining that the current payment transaction is to be approved.

3. The method of claim 1, further comprising:
updating, by the primary processing device in the first database, data included in the account profile where the included account identifier corresponds to the specific account identifier based on the transaction data included in the received current authorization request.

4. The method of claim 3, wherein the data included in the account profile is updated responsive to determining the current payment transaction is to be approved.

5. The method of claim 1, wherein processing the current payment transaction includes storing, in the memory, the received current authorization request and the corresponding determination of approval or denial at a top of the priority transaction processing queue data structure.

6. The method of claim 1, further comprising:
updating, by the primary processing device for each authorization request stored in the normal transaction processing queue data structure, data included in an account profile in the first database where the included account identifier corresponds to an account identifier included in the respective authorization request stored in the normal transaction processing queue data structure based on the transaction data included in the respective authorization request.

7. The method of claim 1, wherein the attempt to determine, by the primary processing device of the processing server, approval or denial of the current payment transaction is unsuccessful responsive to the primary processing device being unable to determine approval or denial of the current payment transaction within a predetermined amount of time.

8. A system for retrying processing of a controlled payment number transaction via a dual processor and a redundant database, comprising:
a first database of a processing server configured to store a plurality of account profiles, wherein each account profile includes data related to a transaction account including at least an account identifier and one or more account controls;
a second database of the processing server configured to store each of the plurality of account profiles stored in the first database, wherein data included in each account profile stored in the second database corresponds to data included in the corresponding account profile in the first database, and wherein the second database is a read-only database;
a memory device configured to store:
a normal transaction processing queue data structure, wherein the normal transaction processing queue data structure includes a first set of one or more pending authorization requests for which processing is required and a determination associated with each of the first set of one or more pending authorization requests, and
a priority transaction processing queue data structure, wherein the priority transaction processing queue data structure includes pending authorization requests for which processing is required and a determination associated with each respective pending authorization request, wherein the processing device is configured to process pending authorization requests stored in the priority transaction processing queue data structure before processing pending authorization requests stored in the normal transaction processing queue data structure;
a receiving device of the processing server configured to receive, via a point of sale device associated with a merchant, a current authorization request for a current payment transaction, wherein the current authorization request includes at least a specific account identifier and transaction data;
a transmitting device of the processing server; and
a primary processing device of the processing server and a secondary processing device of the processing server, wherein the primary processing device of the processing server and the secondary processing device of the processing server are configured to:
responsive to an unsuccessful attempt to determine, by a primary processing device of the processing server, approval or denial of the current authorization request for the current payment transaction based on the one or more account controls included in a corresponding account profile stored in the first database where the included account identifier corresponds to the specific account identifier:
storing, by a secondary processing device of the processing server in the memory device in the priority transaction processing queue data structure, the current authorization request for the current payment transaction; and
determine, by the secondary processing device of the processing server, an approval or denial of the current payment transaction stored in the priority transaction processing queue data structure based on at least the one or more account controls included in an account profile stored in the second database where the included account identifier corresponds to the specific account identifier and the transaction data included in the received current authorization request;
wherein:
the secondary processing device of the processing server is configured to process the current payment transaction based on the determined approval or denial, wherein the processing, by the second processing device of the processing server, of the current authorization request for the current payment transaction stored in the priority transaction processing queue data structure occurs before processing any of the pending authorization requests stored in the memory device in the normal processing queue data structure; and
responsive to determining that the current payment transaction is to be approved, the transmitting device is configured to transmit the current authorization request to a financial institution associated with the transaction account related to the account profile that includes an account identifier corresponding to the specific account identifier.

9. The system of claim 8, wherein the transmitting device is further configured to transmit (i) an authorization response indicating denial of the current payment transaction as a response to the received authorization request, responsive to determining that the current payment transaction is to be denied, or (ii) the current authorization request to an issuer of the transaction account related to the account profile that includes an account identifier corresponding to the specific account identifier, responsive to determining that the current payment transaction is to be approved.

10. The system of claim 8, wherein the primary processing device is further configured to update, in the first database, data included in the account profile where the included account identifier corresponds to the specific account identifier based on the transaction data included in the received current authorization request.

11. The system of claim 10, wherein the data included in the account profile is updated responsive to determining the current payment transaction is to be approved.

12. The system of claim 8, wherein processing the current payment transaction includes storing, in the memory, the received current authorization request and the corresponding determination of approval or denial at a top of the priority transaction processing queue data structure.

13. The system of claim 8, wherein the primary processing device is further configured to update, for each authorization request stored in the normal transaction processing queue data structure, data included in an account profile in the first database where the included account identifier corresponds to an account identifier included in the respective authorization request stored in the normal transaction processing queue data structure based on the transaction data included in the respective authorization request.

14. The system of claim 8, wherein the attempt to determine, by the primary processing device of the processing server, approval or denial of the current payment transaction is unsuccessful responsive to the primary processing device being unable to determine approval or denial of the current payment transaction within a predetermined amount of time.

15. The method of claim 1, wherein responsive to determining that the current payment transaction is to be denied, transmitting, by the transmitting device to an issuer of the transaction account related to the account profile that includes the account identifier corresponding to the specific account identifier, the current authorization request along with an indication to deny the current payment transaction.

16. The system of claim 8, wherein responsive to determining that the current payment transaction is to be denied, transmitting, by the transmitting device to an issuer of the transaction account related to the account profile that includes the account identifier corresponding to the specific account identifier, the current authorization request along with an indication to deny the current payment transaction.

* * * * *